United States Patent

Weber

[15] 3,647,539

[45] Mar. 7, 1972

[54] MAGNETIC RECORDING TAPE AND METHOD FOR PREPARING THE SAME

[72] Inventor: Sheldon Alan Weber, San Mateo, Calif.

[73] Assignee: Ampex Corporation, Redwood City, Calif.

[22] Filed: Feb. 9, 1970

[21] Appl. No.: 10,019

[52] U.S. Cl. ..........117/235, 252/62.54

[51] Int. Cl. ..........H01f 10/02

[58] Field of Search ..........117/235; 252/62.54

[56] References Cited

UNITED STATES PATENTS

| | | | |
|---|---|---|---|
| 3,320,090 | 5/1967 | Graubart | 117/235 |
| 3,387,993 | 6/1968 | Flowers | 117/235 |
| 3,123,641 | 3/1964 | Longley | 260/294.7 X |
| 3,330,693 | 7/1967 | Rumberger | 117/235 |
| 3,357,855 | 12/1967 | Bisschops et al. | 117/235 X |
| 3,515,590 | 6/1970 | Lazzarini et al. | 117/235 |

*Primary Examiner*—Murray Katz
*Assistant Examiner*—Bernard D. Pianalto
*Attorney*—Robert G. Clay

[57] ABSTRACT

Dispersion of magnetic pigments such as gamma ferric oxide, along with a small amount of finely divided carbon, in a resin binder composition applied as a coating to a backing material for use in magnetic recording media is facilitated by use of a triloweralkyl polypropyleneoxy quaternary ammonium dispersant compound. Said dispersant compounds offer the advantages of improved pigment dispersion in less mixing time than has heretofore been possible and of improved electrical conductance in the final recording product. At the same time, the final product is one having improved adhesion between the coating and the substrate.

6 Claims, No Drawings

MAGNETIC RECORDING TAPE AND METHOD FOR PREPARING THE SAME

BACKGROUND OF THE INVENTION

In preparing dispersions of magnetic pigments such as gamma ferric oxide and carbon particles in a liquid binder resin for application as a coating on a backing material which may be in the form of tape, belt, disc or the like, the usual practice is to form a slurry of said iron oxide and carbon particles in a solvent medium and then to blend therein a solution of the binder resin. The resulting composition is then ground for many hours to obtain a dispersion in which the solid particles are evenly distributed. Heretofore a lecithin material has been employed to aid in the preparation of the dispersion, and while acceptable results can be obtained therewith by the practice of long grinding periods, it would be desirable if a method were available which would permit a reduction in the grinding time while also affording other possible advantages. It is an object of this invention to meet this said need.

SUMMARY OF THE INVENTION

The present invention rests on the discovery that by using a triloweralkyl polypropyleneoxy quaternary ammonium compound in formulating the coating to be applied to the substrate of a tape or other magnetic recording media, a well dispersed mixture of gamma ferric oxide pigment and carbon particles in said coating composition can be obtained in a much shorter grinding time than has heretofore been possible using lecithin or other dispersing agents. At the same time, it has been found that quite unexpectedly there is obtained an increase in the conductance of the final coating, together with a substantially improved degree of adhesion between said coating and the substrate. The improved conductance permits of a reduction of the carbon particle content of the mixture, if desired, while still obtaining a product having the desired antistatic properties.

The dispersant employed in the practice of this invention is one having the structural formula

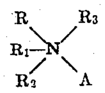

wherein R is an alkyl radical containing from one to three and more particularly from one to two carbon atoms, $R_1$ is an alkyl radical containing from one to three carbon atoms, $R_2$ is a polyoxyalkylene radical containing at least 18 carbon atoms and derived from an $\alpha$-epoxide containing at least three carbon atoms, especially propyleneoxide. In those cases where $R_2$ is derived from propyleneoxide, there will be at least six of such propyleneoxide groups in $R_2$, and more particularly it is desired that $R_2$ contain from eight to 30 oxypropylene groups. $R_3$ is a lower alkyl radical containing from one to four carbon atoms, and A is an anion which can be any negative or salt-forming radical as, for instance, halogen such as chlorine, bromine or iodine. Quaternary ammonium compounds of the type which can be used as dispersants in a practice of this invention, together with methods for their preparation, are described in U.S. Pat. No. 3,123,641, issued Mar. 3, 1964, to which reference is herein made for a more complete description of the compounds.

A particularly preferred group of quaternary ammonium compounds for use in the present invention is made up of diethyl methyl polypropyleneoxy ammonium chloride compounds containing from six to about 30 propyleneoxy groups in the molecule. Further, it has been found that within said range, those compounds having a relatively large number of propyleneoxy groups give improved dispersion over those of lower propyleneoxy chain length. The products marketed by Witco Chemical Company, Inc. as Emcols CC-36 and CC-42 represents diethyl methyl polypropyleneoxy quaternary ammonium chlorides of relatively long polypropyleneoxy chain length, while that designated by Witco as CC-9, while otherwise the same, incorporates a polypropyleneoxy chain of relatively short length.

The quaternary ammonium compounds described above are effective when employed with any of the various doped and undoped gamma ferric oxide pigment used in recording media, with any type of finely divided carbon particles and with any of the commonly employed resin binder systems. Good results can be had when using from about 3 to 10 percent by volume of the total nonvolatile portion of the coating composition applied to the substrate.

In the usual practice of the invention, an initial dispersion is formed which is made up of the carbon black and iron oxide pigment particles, optionally along with a fungicide such as phenyl mercuric oleate or the like and a silicone lubricant, together with the dispersant compound hereof and a solvent medium which is either the same as or compatible with that employed to dissolve the resin. A separate resin solution is prepared and this solution is added, preferably incrementally, to the ferric oxide and carbon dispersion discussed above. The resulting mixture is then ground, as it is formed, in a ball mill or the like for periods which may range from about 5 hours to 50 hours or more depending on the particular apparatus employed and the load placed therein.

The resin binder to be mixed with the particulate dispersion in the fashion discussed above can be selected from a wide variety of materials while still obtaining the benefits of the present invention. Thus, one may employ a resin formulation based on polyesters, diisocyanates, melamine formaldehyde, urea formaldehyde, phenoxy or polyurethane resins, or on various combinations thereof. Preferably, however, the resin employed is a system which contains two resins of high molecular weight. The first of said resins is a high molecular weight phenoxy resin having the following structure:

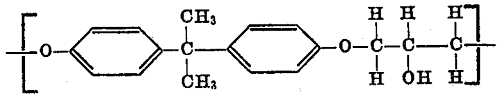

wherein N is approximately 100. A particularly suitable resin is that sold by Union Carbide and Chemicals Corporation as phenoxy resin PRDA-8080 having the following characteristics:

| | |
|---|---|
| Approximate Molecular Weight | 20,000–30,000 |
| Specific Gravity | 1.18 |
| Melt Flow (g./10 minutes at 220° C.) | 2.5–10 |
| Ultimate Tensile Strength, p.s.i. | 9,000–9,500 |
| Ultimate Tensile Elongation, % | 50–100 |
| Softening Temperature | 100° C. |
| Moisture Vapor Transmission | 3.5 g./mil/24 hr./100 in.² |

The second component of the resin is an elastomeric polyurethane resin made by reacting a diisocyanate such as 2,4-toluene diisocyanate, hexamethylene diisocyanate or p-p'diphenylmethane diisocyanate with a disbasic acid such as adipic or phthalic acids and a polyhydroxy alcohol such as glycerin, hexanetriol, and butanediol. One particularly suitable polyurethane is made by reacting p-p'-diphenylmethane diisocyanate, adipic acid and butanediol-1,4 in such proportions that all of the isocyanate groups have reacted to give a substantially unreactive polymer. Such resins are sold by B. F. Goodrich under the tradenames of ESTANE 5740–X–1 and X–2, which have the following characteristics:

| | X–1 | X–2 |
|---|---|---|
| Specific Gravity | 1.21 | 1.19 |
| Hardness (Durometer A) | 88 | 65 |
| Tensile Strength at 73.4° F. (p.s.i.) | 5840 | 5,000 |
| 300% modulus at 73.4° F. (p.s.i.) | 1240 | 420 |
| Taber abrasion resistance (gram loss —CS17 wheel 1,000 g./wheel 500 rev.) | 0.0025 | 0.15 |

The phenoxy-polyurethane resin ratio, on a resin solids basis, can vary from about 75 percent phenoxy resin to 25 percent polyurethane resin to about 25 percent phenoxy resin to 75 percent polyurethane resin. Preferably about equal parts are used. The final nonvolatile coating composition will contain on a solids basis about 60–80 percent of a magnetic pigment, with the balance being the resinous binder described and carbon black.

Conventional solvents which can be employed to form the carbon particle-iron oxide dispersion along with the quaternary ammonium dispersing agent hereof, as well as for dissolving the resin components, includes such materials as methyl ethyl ketone, toluol, methyl isobutyl ketone, n-butyl alcohol and tetrahydrofuran.

If one desires to have a tape having a thermoset binder, the above thermoplastic formulations can be modified by adding thereto a melamineformaldehyde resin or a urea formaldehyde resin. A suitable melamineformaldehyde resin can be prepared by reacting together 5 to 6 moles of formaldehyde with one mole of melamine and one to two moles of butanol per mole of melamine. A particularly suitable resin is sold under the name of Super-Beckamine 3550–50 by Reichhold Chemicals and has the following properties:

| | |
|---|---|
| Nonvolatile | 50% |
| Volatiles | xylol-butanol |
| Viscosity | L–P (Gardner-Holdt) |
| Acid | 2 maximum |

A suitable urea formaldehyde resin can be made by reacting one mole of urea with two moles of formaldehyde and one mole of butanol. One such resin is sold by Reichhold under the name Beckamine P 196–60. This resin has the following properties:

| | |
|---|---|
| Nonvilatile | 58–62% |
| Volatiles | butanol-ethanol |
| Viscosity | K–M (Gardner-Holdt) |
| Acid number | 2 maximum |

The amount of the formaldehyde resin which is added can be varied to up to 30% of the phenoxy resin content. Preferably at least 10% is employed.

DESCRIPTION OF THE PREFERRED EMBODIMENTS

The following nonlimiting examples show various methods of formulating thermoplastic coating compositions in accordance with the method of the present invention.

EXAMPLES 1–5

In Table I below are given formulations for five resin compositions containing gamma ferric oxide and carbon particles dispersed therein. The formulations of Examples 1–3 are prepared using Emcol-CC–42 as the dispersant, Example 4 Emcol 33, while that of Example 5 (which is illustrative of the prior art and is inserted here for comparative purposes only) is prepared using soya lecithin as a dispersant. In each of Examples 1–4, the dispersion containing dispersed ferric oxide and carbon particles (together with silicone oil) is ground for 24 hours, at which time inspection showed that an excellent state of dispersion exists. The similarly prepared composition of Example 5 is ground for a much longer time in an effort to obtain a dispersion of similar quality. However, at the end of 72 hours of grinding, the dispersion is of poorer quality (as evidenced by residual maldistribution of the dispersed particles) than that of any of Examples 1–4.

TABLE I

| | Examples | | | | |
|---|---|---|---|---|---|
| | 1 | 2 | 3 | 4 | 5 |
| Dispersion | Parts by Weight | | | | |
| Magnetic oxide | 48.5 | 48.5 | 48.5 | 48.5 | 48.5 |
| Carbon black | 5.1 | 5.1 | 5.1 | 5.1 | 5.1 |
| Silicone oil | 1.8 | 1.8 | 1.5 | 2.5 | 1.8 |
| Emcol CC–42 | 2.1 | 1.5 | 1.8 | — | — |
| Emcol CC–33 | — | — | — | 2.1 | — |
| Soya lecithin | — | — | — | — | 2.1 |
| Methyl ethyl ketone | 17.0 | 17.6 | 18.1 | 16.8 | 17.0 |
| Toluol | 15.0 | 15.0 | 5.0 | 20.0 | 15.0 |
| Methyl isobutyl ketone | 10.5 | 10.5 | 20.0 | 5.0 | 10.5 |
| | 100.0 | 100.0 | 100.0 | 100.0 | 100.0 |
| Resin solutions added to above dispersions: | | | | | |
| Parts per hundred dispersion | 50.0 | 50.0 | 46.0 | 56.0 | 50.0 |
| Phenoxy PRDA-8080 | — | — | 10.5 | 11.0 | 8.6 |
| Saran F-130 | 8.6 | 15.9 | — | — | — |
| Estane X-2 | 12.9 | 5.2 | 10.5 | — | 12.9 |
| Estane X-1 | — | — | — | 11.0 | — |
| Methyl ethyl ketone | 49.3 | 51.7 | 40.3 | 10.5 | 38.1 |
| Methyl isobutyl ketone | 12.8 | 6.4 | 7.6 | — | 12.8 |
| Toluol | 16.4 | 20.8 | 17.7 | — | 16.4 |
| N-butyl alcohol | — | — | 13.4 | — | 11.2 |
| Tetrahydrofuran | — | — | — | 67.5 | — |
| | 100.0 | 100.0 | 100.0 | 100.0 | 100.0 |

The coatings of Examples 1, 2 and 5 are applied to a cellulose acetate substrate, that of Example 3 to a Mylar substrate and that of Example 4 to a polypropylene substrate. In each case the wet coating is dried in a three-zone oven at 175° F. for the first zone and 225° F. for the second and third zones. The coating speed is 120 feet per minute and the total residence time of the coated tape or film in the oven is 35–40 seconds. The coated films so prepared are wound immediately upon leaving the oven and are later tested for adhesion, conductance and magnetic properties.

While all the coatings have good magnetic properties, it is found that the resistance of the products of Examples 1–4 is approximately 1.5 to $2.5 \times 10^6$ ohms per square, while that of Example 5 is $3 \times 10^9$ ohms per square.

The adhesion between the coatings of Examples 1–4 to the several substrates thereof is also substantially better than that of the Example 5 product. In this test, pressure sensitive tape is applied to the coating surface and then pulled away. The amount of coating removed with the Example 1–4 products is well below that observed with the Example 5 product prepared with the lecithin dispersant.

I claim:

1. A magnetic recording medium comprising a backing material and an adherent coating thereon, said coating comprising finely divided magnetic pigment and carbon particles uniformly dispersed in a resin binder containing from about 3 to 10 percent, in terms of the coating volume, of a dispersant having the formula

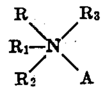

wherein A is an anion, R and $R_1$ are alkyl radicals of from one to three carbon atoms each, $R_3$ is an alkyl radical of from one to four carbon atoms and $R_2$ is a polyoxyalkylene radical containing at least 18 carbon atoms and derived from an α-epoxide containing at least three carbon atoms.

2. A magnetic recording medium as defined in claim 1 wherein $R_2$ is derived from propyleneoxide.

3. A magnetic recording medium as defined in claim 1 wherein the dispersant is a diethyl methyl polypropyleneoxy quaternary ammonium chloride containing from eight to 30 oxypropylene groups.

4. A magnetic recording medium as defined in claim 3 wherein the binder resin comprises from 25 to 75 percent of a phenoxy resin and from 75 to 25 percent of a polyurethane resin made by reacting a diisocyanate, a dibasic acid and a polyol.

5. A magnetic recording medium as defined in claim 4 wherein the binder resin also contains a component selected from the group consisting of melamine-formaldehyde and urea formaldehyde resins.

6. A magnetic recording medium as defined in claim 1 wherein the magnetic pigment is gamma ferric oxide.

* * * * *